(12) United States Patent
Manzoni et al.

(10) Patent No.: US 9,182,284 B2
(45) Date of Patent: Nov. 10, 2015

(54) PHASE-LOCKED DELAY DEVICE INCLUDING AN OPTICAL WEDGE PAIR

(75) Inventors: Cristian Angelo Manzoni, Villa di Serio (IT); Daniele Brida, Cassano Magnago (IT); Giulio Nicola Felice Cerullo, Milan (IT)

(73) Assignees: POLITECNICO DI MILANO, Milan (IT); CONSIGLIO NAZIONALE DELLE RICERCHE, Rome (IT)

( * ) Notice: Subject to any disclaimer, the term of this patent is extended or adjusted under 35 U.S.C. 154(b) by 509 days.

(21) Appl. No.: 13/490,862

(22) Filed: Jun. 7, 2012

(65) Prior Publication Data
US 2013/0329228 A1    Dec. 12, 2013

(51) Int. Cl.
| | |
|---|---|
| G01J 3/45 | (2006.01) |
| G01J 3/28 | (2006.01) |
| G01J 3/433 | (2006.01) |
| G01J 3/453 | (2006.01) |
| G01J 11/00 | (2006.01) |
| H01S 3/00 | (2006.01) |

(52) U.S. Cl.
CPC .............. *G01J 3/2889* (2013.01); *G01J 3/433* (2013.01); *G01J 3/453* (2013.01); *G01J 11/00* (2013.01); *H01S 3/005* (2013.01)

(58) Field of Classification Search
CPC ............. G01J 3/00; G01J 3/45; G01J 3/0224; G02B 26/06; G01B 9/02014
USPC ........................................... 356/453, 455, 491
See application file for complete search history.

(56) References Cited

U.S. PATENT DOCUMENTS

| | | | | |
|---|---|---|---|---|
| 3,737,235 | A * | 6/1973 | Hawes | 356/453 |
| 5,420,717 | A * | 5/1995 | Tabata | 359/371 |
| 6,195,167 | B1 | 2/2001 | Reid | |
| 2008/0175597 | A1 | 7/2008 | Arahira | |
| 2009/0161092 | A1 | 6/2009 | Zanni | |
| 2010/0171952 | A1* | 7/2010 | DeFlores et al. | 356/327 |

OTHER PUBLICATIONS

Pawlowska Monika et al; "Colllinear interferometer with variable delay for carrier-envelope offset frequency measurement", Review of Scientific Instruments, AIP, Melville, NY, US, vol. 80, No. 8, Aug. 18, 2009, pp. 83101-83101, XP012128427.

(Continued)

*Primary Examiner* — Jonathan Hansen
(74) *Attorney, Agent, or Firm* — Sughrue Mion, PLLC

(57) ABSTRACT

A phase-locked delay device, including: an input port configured to receive an input electromagnetic radiation pulse; said input pulse being to be propagated along a propagation direction and having a first linear polarization different from both a first direction, which is orthogonal to the propagation direction, and a second direction, which is orthogonal to the first direction and the propagation direction; an adjustable Babinet-Soleil module optically coupled to said input port, having a first polarization direction parallel to said first direction. The adjustable Babinet-Soleil module is structured to: provide from the input pulse a first pulse polarized along the first direction and a second pulse collinear to said first pulse and polarized along the second direction, and introduce an adjustable group delay between the first pulse and the second pulse ranging from a minim value $\Delta T_m$ and a maximum value $\Delta T_M$; the maximum value $\Delta T_M$ being a value greater than 10 fs.

19 Claims, 17 Drawing Sheets

(56) References Cited

OTHER PUBLICATIONS

Pochi Yeh; "Autocorrelation of Ultrashort optical pulses using polarization interferometry", Optics Letters, vol. 8, No. 6, Jun. 1, 1983, p. 330, XPO55073975.

M. U. Wehner et al., "Scanning Interferometer Stabilized by use of Pancharatnam's Phase", Optics Letters, 1997, pp. 1455-1457, vol. 22, No. 19.

Extended European Search Report; dated Aug. 9, 2013; corresponding to Application No. 13168800.4.

* cited by examiner

PHASE-LOCKED DELAY DEVICE INCLUDING AN OPTICAL WEDGE PAIR

BACKGROUND

1. Technical Field

Apparatus consistent with exemplary embodiments broadly relates to techniques for generating collinear and phase-locked replicas of an electromagnetic radiation pulse.

2. Description of Related Art

An important application that calls for a pair of phase-locked pulses is the so called Two-dimensional (2D) optical spectroscopy. This technique is used by a growing community of physicists, chemists and biologists both in the infrared (IR) range, targeting vibrational transitions (2DIR spectroscopy), and in the visible range, targeting electronic transitions (2D electronic spectroscopy). In its most simple implementation, 2D spectroscopy uses a pump-probe geometry with two phase-locked collinear pulses exciting the sample, which is then probed by a third non-collinear pulse.

A second application concerns the FTIR (Fourier Transform infrared) spectrometry. In this technique two delayed broadband beams impinge on a sample in order to measure its absorption spectrum.

The generation of phase-locked delayed pulse replicas is currently performed by means of two main techniques. The first technique is based on the Michelson interferometer according to which an interference pattern is produced by splitting a beam of light into two paths, bouncing the beams back and recombining them. This technique requires complex feedback circuits to keep the interferometer in stability conditions. Moreover, higher feedback accuracy is required for shorter wavelengths; therefore, it is observed that the Michelson interferometer method does not appear satisfying for generating pulse replicas of radiation with sub-wavelength accuracy.

The generation of delayed pulse replicas by means of a Michelson interferometer is described as an example in M. U. Wehner et al., Opt. Lett. 22, pages 1455-1457 (1997).

The second known technique is based on a "pulse shaper" which generates the pulse replicas by suitably applying spectral amplitude modulation and spectral phase modulation to a pulse. This technique appears particularly complex and expensive.

Document US-2009-0161092 describes an optical device employed to generate delayed pulse replicas to be employed in a multidimensional spectrometer.

In optics, the Babinet-Soleil compensator is known. The Babinet-Soleil compensator is a continuously variable, zero-order retarder employing a birefringent wedge which is movable and another birefringent wedge which is fixed to a compensator plate. The orientation of the long axis of the wedges is perpendicular to the long axis of the compensator plate. The known Babinet-Soleil compensators are employed in optics to introduce phase delays between two orthogonal polarizations of an electromagnetic field; such phase delays are limited to one optical cycle (e.g. a maximum phase delay of 5.5 fs at 1650 nm) and their effect is to rotate the polarization or act as phase equalizers. Movement of the birefringent wedge is required in order to tune the device to the given electromagnetic field frequency.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, a phase-locked delay device is provided. The phase-locked delay device includes:

an input port configured to receive an input electromagnetic radiation pulse; said input pulse being to be propagated along a propagation direction and having a first linear polarization different from a first direction, which is orthogonal to the propagation direction, and a second direction, which is orthogonal to the first direction and the propagation direction;

an adjustable Babinet-Soleil module optically coupled to said input port, having a first polarization direction parallel to said first direction, wherein the adjustable Babinet-Soleil module is structured to:

provide from the input pulse a first pulse polarized along the first direction and a second pulse collinear to said first pulse and polarized along the second direction, and introduce an adjustable group delay $\Delta T$ between the first pulse and the second pulse ranging from a minim value $\Delta T_m$ and a maximum value $\Delta T_M$; the maximum value $\Delta T_M$ being a value greater than 10 fs.

BRIEF DESCRIPTION OF THE DRAWINGS

The above and/or other aspects will be more apparent from the following description of exemplary embodiments, with reference to the accompanying drawings, in which.

DETAILED DESCRIPTION

Hereinafter, exemplary embodiments will be described in greater detail with reference to the accompanying drawings. In the following description, same alphanumeric references are used for analogous exemplary elements when they are depicted in different drawings. The matters defined in the description, such as detailed construction and specific elements, are provided to assist in a comprehensive understanding of exemplary embodiments. It is apparent to one of ordinary skill in the art that the exemplary embodiments can be carried out without those specifically defined matters and in various ways.

Figure 1:
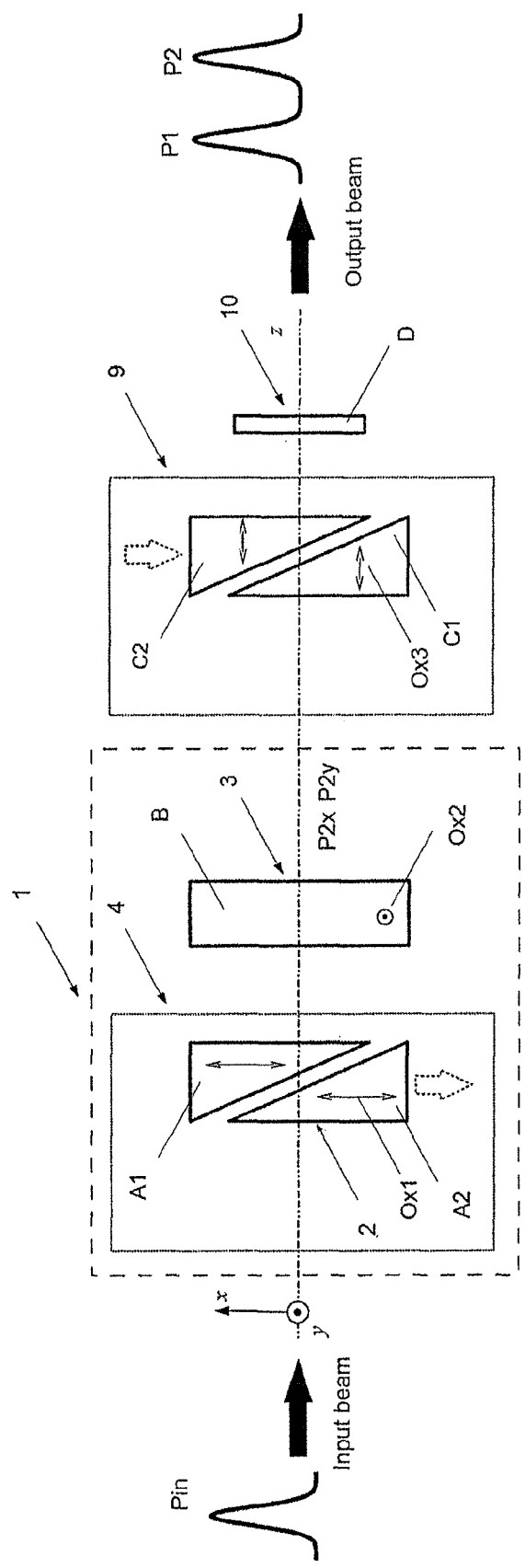
FIG. 1 is a view schematically showing a phase-locked delay device according to an exemplary embodiment.

FIG. 1 shows a first exemplary embodiment of a phase-locked delay device 100. The phase-locked delay device 100 (hereinafter also "delay device") is configured to generate two delayed, collinear replicas of an input electromagnetic radiation pulse. With reference to the optical structure of the delay device 100, the following axes/directions can be defined:
- a propagation direction z,
- a first direction x, which is orthogonal to the propagation direction z, and
- a second direction y, which is orthogonal to the first direction x and the propagation direction z.

The first direction x and the second direction y define a plane which is orthogonal to the propagation direction z.

The delay device 100 includes an adjustable Babinet-Soleil module 1 which is an optical device comprising optical components in birefringent material/s.

As it is known by the skilled in the art, an electromagnetic field can be always decomposed in the sum of two independent fields with orthogonal polarizations. In a birefringent material the directions of such polarizations are determined by the structure of the material; the two orthogonal directions are named the "fast" and the "slow" polarization directions. The radiation having linear polarization along the fast direction sees the fast refractive index $n_f$ and travels with the fast group velocity $v_{gf}$ and the fast phase velocity $v_{pf}$. The radiation having linear polarization along the slow direction sees the slow refractive index $n_s$ and travels with the slow group velocity $v_{gs}$ and the slow phase velocity $v_{ps}$.

It is also known by the skilled in the art that birefringence does not occur if the electromagnetic field propagates along one of the two privileged directions of the birefringent material, named "optical axes".

Birefringent materials are classified "biaxial birefringent materials" when the two optical axes have different orientations in space, and "uniaxial birefringent materials" when the two optical axes degenerate in one axis only.

The Babinet-Soleil module 1 defines, in accordance with the exemplary embodiment described, a first slow polarization direction OX1 parallel to the first direction x and a second slow polarization direction OX2 parallel to second direction y.

The Babinet-Soleil module 1 is provided with an input port 2 and an output port 3. The input port 2 is structured to receive an electromagnetic radiation input pulse Pin associated with an electromagnetic wave carrier having an optical cycle Tc, wherein Tc=1/f; f is the frequency of the electromagnetic wave carrier and f=c/λ, wherein c is the speed of light in vacuum and λ is the wavelength. Therefore the optical cycle Tc is λ/c.

Particularly, the delay device 100 can be configured to operate on pulses having carrier radiation at wavelength λ comprised at least in the following range: 200 nm-15000 nm (from the ultraviolet to the mid-infrared range).

The optical cycle Tc of the electromagnetic radiation carrier is comprised between 0.66 femtoseconds (fs) and 50 fs.

The electromagnetic radiation input pulse Pin (hereinafter also called input pulse) can be an ultra-short pulse and its duration T can be in the femtosecond (fs) to picosecond (ps) range. Such pulses have a broadband optical spectrum, and can be generated by laser systems starting from mode-locked oscillators.

The Babinet-Soleil module 1 is configured to provide on the first output port 3 and from the input pulse Pin a first output electromagnetic radiation pulse $P_{2x}$ (hereinafter: first output pulse), polarized along the first direction x, and a second electromagnetic radiation pulse $P_{2y}$ (hereinafter: second output pulse) polarized along the second direction y.

The first output pulse $P_{2x}$ and the second output pulse $P_{2y}$ are collinear, i.e. both pulses propagate along the propagation direction z. The first output pulse $P_{2x}$ and the second output pulse $P_{2y}$ are relatively delayed, i.e. the first output pulse $P_{2x}$ is temporally shifted with respect to the second output pulse $P_{2y}$.

The delay device 100 is designed to introduce an adjustable relative group delay ΔT between the first output pulse $P_{2x}$ and the second output pulse $P_{2y}$. The group delay ΔT is the delay between the envelopes of the two considered pulses. The delay device 100 is designed to allow an adjusting of the group delay ΔT between a minim value $ΔT_m$ and a maximum value $ΔT_M$ where the maximum value $ΔT_M$ is greater than 10 fs. Particularly, the maximum value $ΔT_M$ is comprised between 10 fs and 10 ps, and more particularly, is comprised between 10 fs and 4 ps. Moreover, in accordance with particular embodiments the maximum value $ΔT_M$ is greater than 100 fs, or is greater than 500 fs.

Particularly, the group delay ΔT can be adjusted to assume values ranging from −10 ps and +10 ps; more particularly from −6 ps and +6 ps. In accordance with some examples, the group delay ΔT can be adjusted to assume values ranging from −4 ps and +4 ps or from −2 ps to +2 ps.

The design of the delay device 100 to obtain the above indicated values of the group delay ΔT is based on the choice of suitable birefringent materials, the geometrical arrangement, the accuracy in the positioning of the optical materials, and the wavelength of the electromagnetic field.

It is observed that in an exemplary embodiment a phase-locked delay device is a device which allows a static control of the relative delay between the two pulses exiting the device itself which shows interferometric precision, that is, as an example, a precision of about Tc/1000, over a long observation time.

In greater detail and in accordance with a first exemplary embodiment, the Babinet-Soleil module 1 comprises a first adjustable wedge pair 4 and an optical element B. The first adjustable wedge pair 4 is made of a first birefringent material and structured to introduce a first total shorter delay in radiation having linear polarization along the first slow polarization direction OX1 and a first total longer delay in the radiation having linear polarization along the second direction y. The first birefringent material can be a uniaxial material or a biaxial optical material.

Particularly, the first adjustable wedge pair 4 comprises a first optical wedge A1 and a second optical wedge A2. Both first A1 and second A2 optical wedges are in the first birefringent material and, as an example, show a first slow polarization direction OX1 parallel to the first direction x and a first fast polarization direction parallel to the second direction y.

Figure 5:
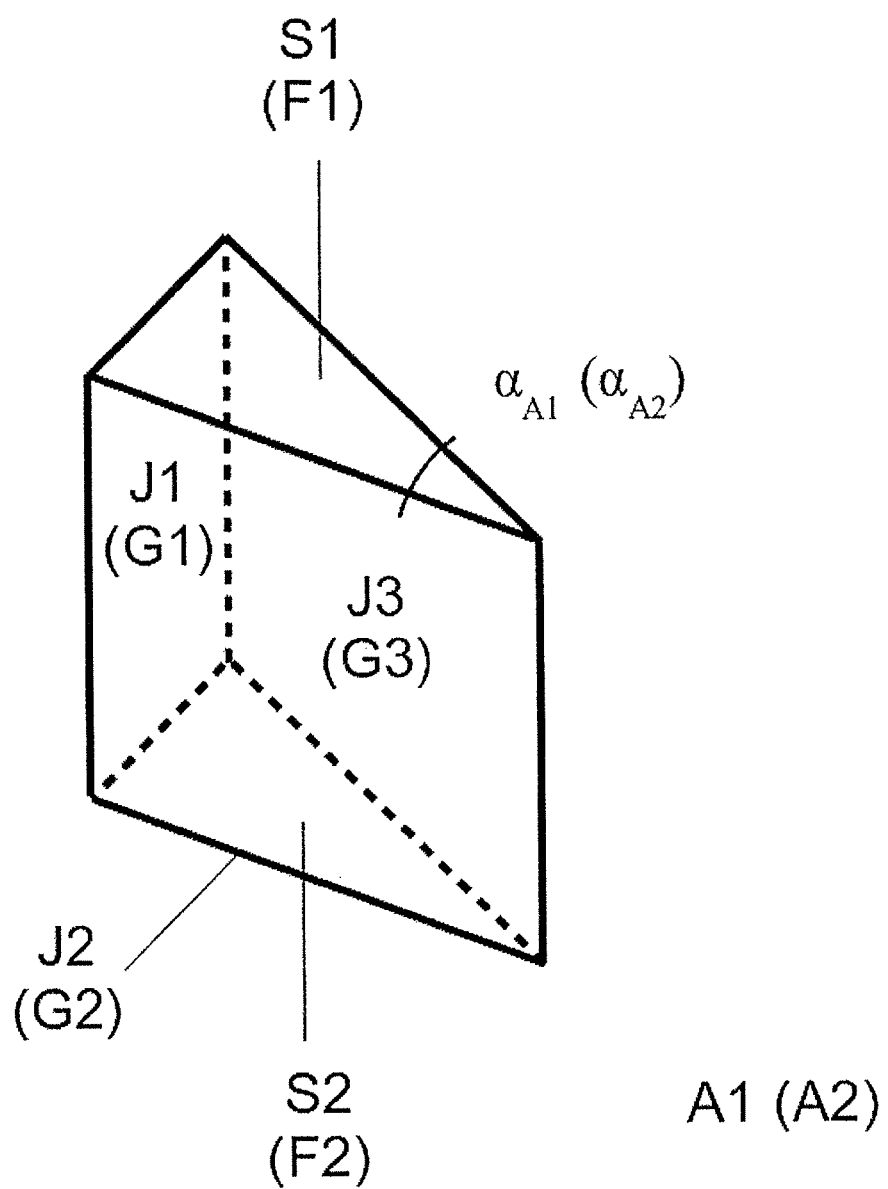
FIG. 5 is a perspective view showing an optical wedge employable in a first optical wedge pair according to an exemplary embodiment.

As it is shown by way of an example, in FIG. 5, the first optical wedge A1 is an optical prism having a first triangular face S1, a second triangular face S2 parallel to the first triangular face S1 and a first joining face J1, a second joining face J2 and a third joining face J3, each joining parallel sides of the first and second parallel triangular faces S1 and S2.

The first joining face J1, the second joining face J2 and the third joining face J3 are parallelograms which are orthogonal to the first and second triangular faces S1 and S2. The second joining face J2 and the third joining face J3 form a first apex angle $\alpha_{A1}$ (FIG. 2) and the second joining face J2 and the first joining face J1 form a right angle.

The second optical wedge A2, analogous to the first optical wedge A1, is an optical prism having a further first triangular face F1, a further second triangular face F2 parallel to the further first triangular face F1 and a further first joining face G1, a further second joining face G2 and a further third joining face G3. The further second joining face G2 and the further third joining face G3 form a second apex angle $\alpha_{A2}$ (FIG. 2) and the further second joining face G2 and the further first joining face G1 form a right angle.

According to the a first exemplary embodiment described with reference to FIG. 1, the second optical wedge A2 is placed so as to show the further second joining face G2, which acts as first input 2, orthogonal to the propagation direction z. The first optical wedge A1 is placed in such a way to show the second joining face J2 orthogonal to the propagation direction z and the third face J3 faced to the further third face G3. The second optical wedge A2 is optically coupled to the first optical wedge A1.

According to an exemplary embodiment, the wording "a first optical component is optically coupled to a second optical component" means that coupling is such that electromagnetic radiation can be transmitted from the first optical component to the second optical component and viceversa, and the first optical component and the second optical component can be separated by free space or by a further optical component. In an exemplary embodiment, coupling may be direct i.e., without any devices in between or indirect i.e., with other elements being present between the first and second optical components.

It is observed that when the first apex angle $\alpha_{A1}$ is different from the second apex angle $\alpha_{A2}$ chromatic dispersion is introduced in the radiation passing through the optical wedge pair 4 since the joining face J3 is not parallel to the joining face G3, and the combination of optical wedge A1 and optical wedge A2 acts as a prism.

The first optical wedge A1 and/or the second optical wedge A2 are movable so as to adjust a length of an optical path covered by radiation along the propagation direction z. According to an exemplary first embodiment, the second optical wedge A2 is movable while the first optical wedge A1 is fixed. Particularly, the second optical wedge A2 can be translated parallel to the first direction x and/or rotate around an axis parallel to the second direction y.

Figure 2:
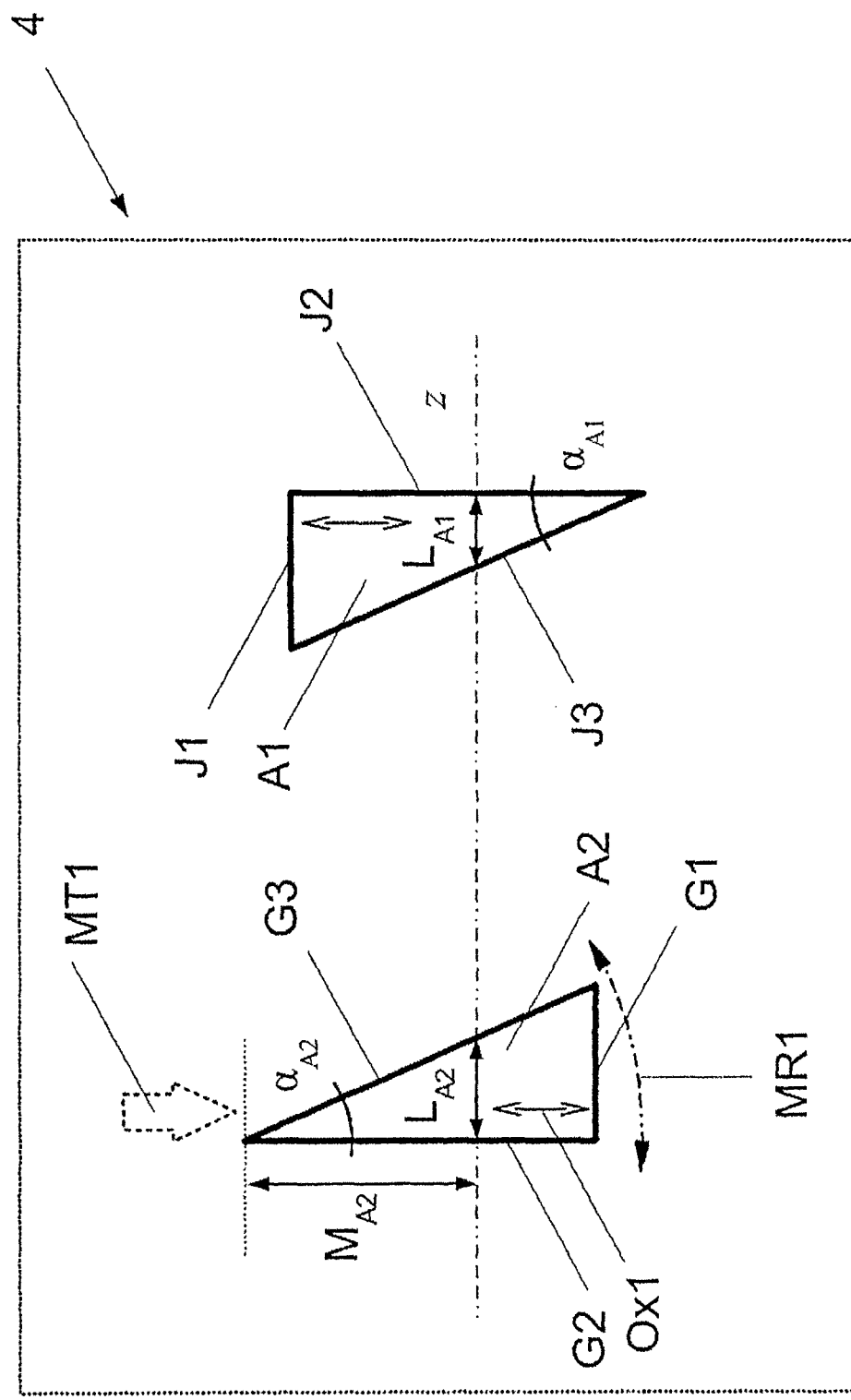
FIG. 2 is a lateral view schematically showing a first optical wedge pair employable in a phase-locked delay device according to an exemplary embodiment.

The translation of the second optical wedge A2 can be obtained by employing a movable structure MT1 supporting the second optical wedge A2 (an example of which is schematically represented in FIG. 2 by a dashed arrow) and the rotation of the second optical wedge A2 can be achieved the by means of a rotatable structure MR1 (an example of which is represented by a dash-dotted arrow in FIG. 2) mechanically coupled to the second optical wedge A2.

In accordance with the an exemplary embodiment, the movable structure MT1 is structured to adjust the group delay $\Delta T$ with a delay increment $\delta T$ lower than 10 attoseconds (as). Particularly, the delay increment $\delta T$ is lower than 5 as. More particularly, the delay increment $\delta T$ is comprised between 0.06 as and 5 as. In accordance with an example, the delay increment $\delta T$ is comprised between 0.06 as and 3 as.

The movable structure MT1 can comprise, as an example, a stepper motor and a servo motor allowing a translation increment of the second optical wedge A2 of 50 nm, so allowing a minimum delay increment $\delta T$ of 3 as. In accordance with another example, the movable structure MT1 comprises a translation device based on a stick-slip principle as, for instance, the movement device sold by the company SmarAct GmBH (Germany), which allows a translation increment of the second optical wedge A2 of 1 nm, so allowing a minimum delay increment $\delta T$ of 0.06 as.

Figure 3:
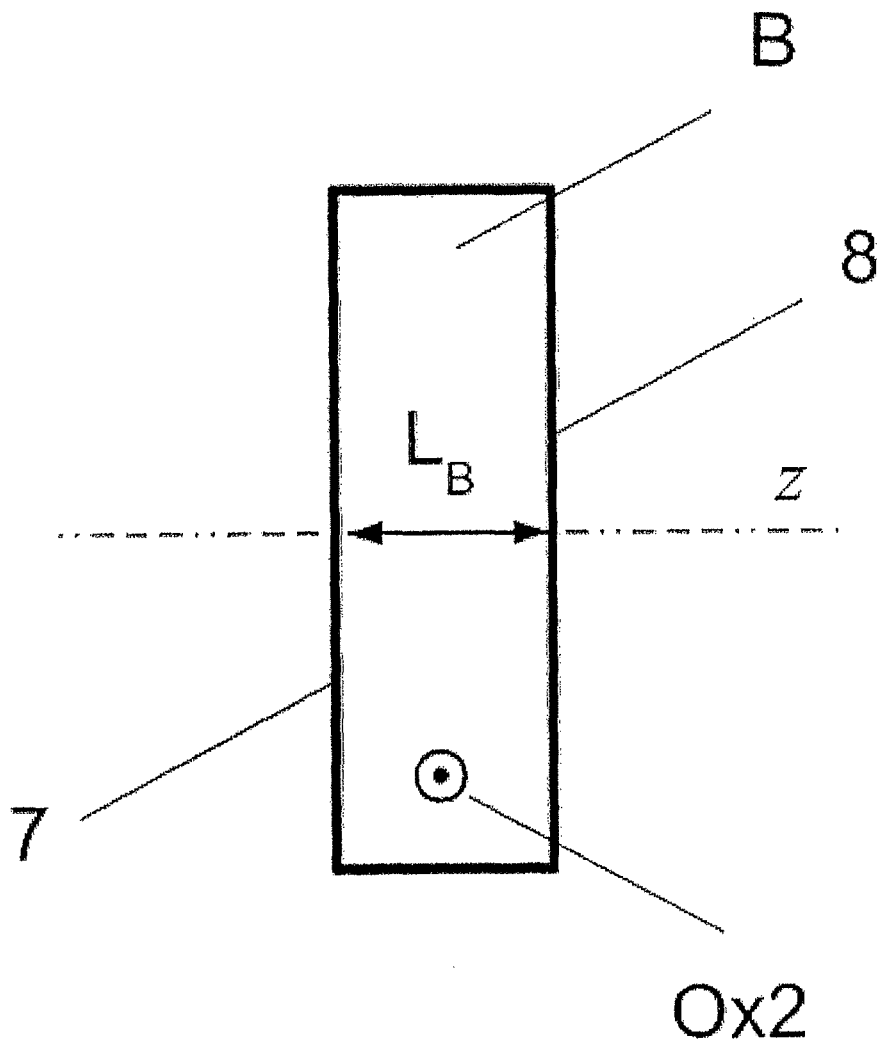
FIG. 3 is a lateral view schematically showing an optical element employable in a phase-locked delay device according to an exemplary embodiment.

The optical element B (example of which is shown in FIG. 3) is made in a second birefringent material, which can be the same first material employed for the first wedge pair 4, and has a second slow polarization direction OX2 parallel to the second direction y, i.e. orthogonal to the first slow polarization direction OX1. The optical element B is optically coupled to the first optical wedge pair 4; particularly the first optical wedge pair 4 and the optical element B are separated by free space. The second birefringent material can be a uniaxial material or a biaxial optical material.

The optical element B can be an optical plate having a first input face 7, which is orthogonal to the propagation direction z and faced to the second joining face J2, and an output face 8. In the case in which the input face 7 and the output face 8 are parallel each other, chromatic dispersion in the radiation passing through the optical element B is avoided, since no refraction phenomena occur when radiation traverses orthogonally face 7 and face 8.

In accordance with a second exemplary embodiment the delay device 100 can also comprise an optional second adjustable wedge pair device 9 having one optical axis OX3 parallel to the propagation direction z and thus introducing an equal delay in the electromagnetic radiation pulses propagating along the propagation direction z and having linear polarization along the first direction x and the electromagnetic radiation pulses propagating along the propagation direction z and having linear polarization along the second direction y.

The second adjustable wedge pair device 9, optically coupled to the optical element B, can be analogous to the first adjustable wedge pair 4 and includes a third optical wedge C1 having said optical axis OX3 and a fourth optical wedge C2 having said optical axis OX3.

The third optical wedge C1 and the fourth optical wedge C2 can be made in a third birefringent material, as an example the first material, and can be a uniaxial or a biaxial optical material.

The third optical wedge C1 defines a first joining tilted face F1 which is faced to a second joining tilted face F2 of the fourth optical wedge C2. The third optical wedge C1 defines a third apex angle $\alpha_{C1}$ (FIG. 4) and the fourth optical wedge C2 defines a fourth apex angle $\alpha_{C2}$.

The third optical wedge C1 and/or the fourth optical wedge C2 are movable so as to adjust a length of an optical path covered by electromagnetic radiation propagating along the propagation direction z. According to the second exemplary embodiment, the fourth optical wedge C2 is movable while the third optical wedge C1 is fixed. Particularly, the fourth optical wedge C1 can be translated parallel to the first direction x and/or rotated around an axis parallel to the second direction y.

Figure 4:
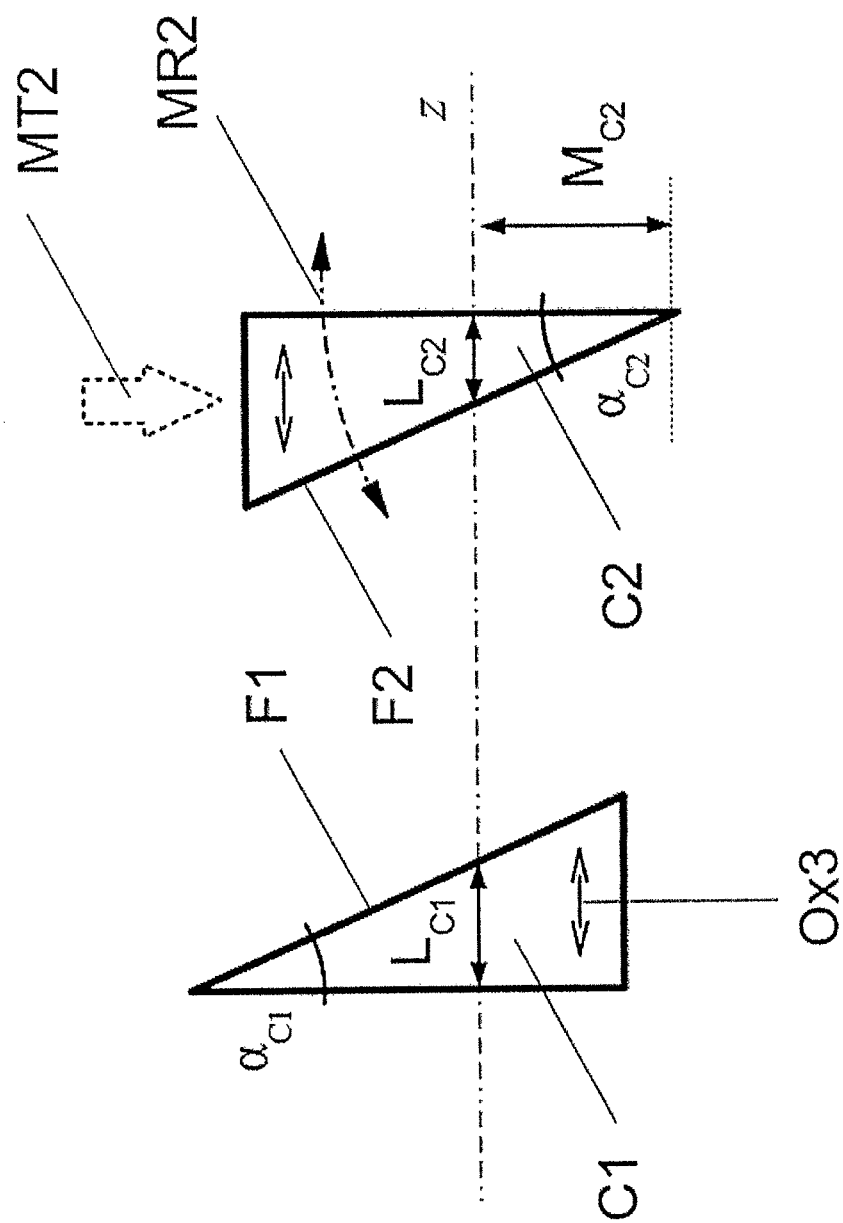
FIG. 4 is a lateral view schematically showing a second optical wedge pair employable in a phase-locked delay device according to an exemplary embodiment.

The translation of the fourth optical wedge C2 can be obtained by employing a further movable structure MT2 (an example of which is shown schematically in FIG. 4 by a dashed arrow), as an example analogous to the movable structure MT1, supporting the fourth optical wedge C2 and the rotation of the fourth optical wedge C2 can be achieved by means of a further rotatable structure MR2 (an example of which is shown schematically in FIG. 4 represented by a dash-dotted arrow) mechanically coupled to the fourth optical wedge C2.

The delay device 100 is optionally provided with a first output polarizer D (an example of which is shown in FIG. 1) structured to project the polarization of incoming radiation along a given direction and provide at an output 10 radiation with a fixed output linear polarization forming an output polarization angle $\phi_P$ with the first direction x.

The delay device 100 illustrated in FIG. 1 refers to an example in which the employed optical components are optically coupled in free space, i.e. without interposition of further optical components, according to an exemplary embodiment.

As an example, the delay device 100 shows a total geometrical length, computed from the first input 2 to the output 10 along the propagation direction z, comprised between 0.8-1.5 cm.

With reference to the selection of materials (particularly, birefringent materials) to be employed in the manufacturing of the first optical wedge pair 4 and/or the optical device B and/or the second optical wedge pair 9, these materials can be chosen considering the spectral range of the input electromagnetic radiation and the total amount of the delay that the delay device 100 is supposed to introduce. Examples of employable birefringent materials are: calcite, α-barium borate (α-BBO), magnesium fluoride, crystal quartz, cadmium selenide, cadmium sulphide, cadmium thiogallate and cadmium germanium arsenide. The above mentioned materials are "uniaxial birefringent materials" and are provided by way of an example.

Moreover, it is noticed that suitable birefringent materials employable for the manufacturing of the Babinet-Soleil module 1 and, as an example, for the second optical wedge pair 9, such as α-BBO and calcite show a refractive slow index n, comprised between 1.672 and 1.657 and a fast refractive index $n_f$ comprised between 1.486 and 1.532.

Figure 6:
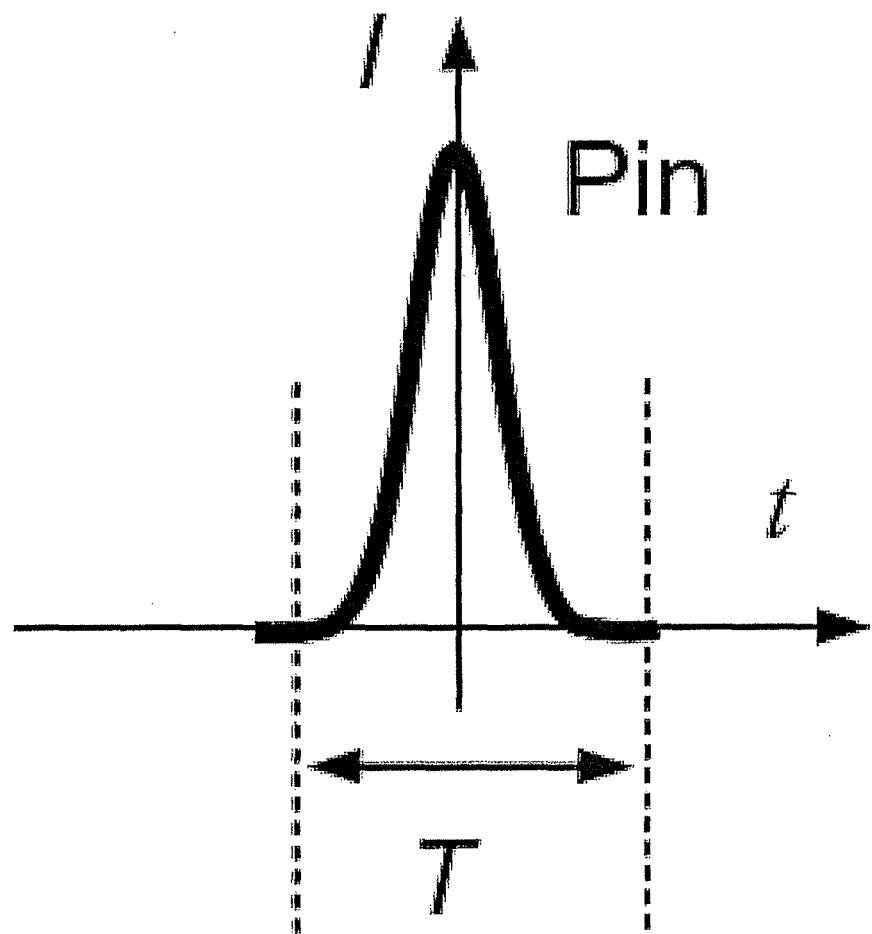
FIG. 6 is a diagram showing the shape of an input pulse entering A phase-locked delay device according to an exemplary embodiment.

With reference to the operation of the delay device 100 of FIG. 1 according to an exemplary embodiment, an input electromagnetic radiation or beam in the form of the input pulse Pin (shown as an example, in FIG. 6) is provided to the first input 2 of the Babinet-Soleil module 1.

Figure 7:
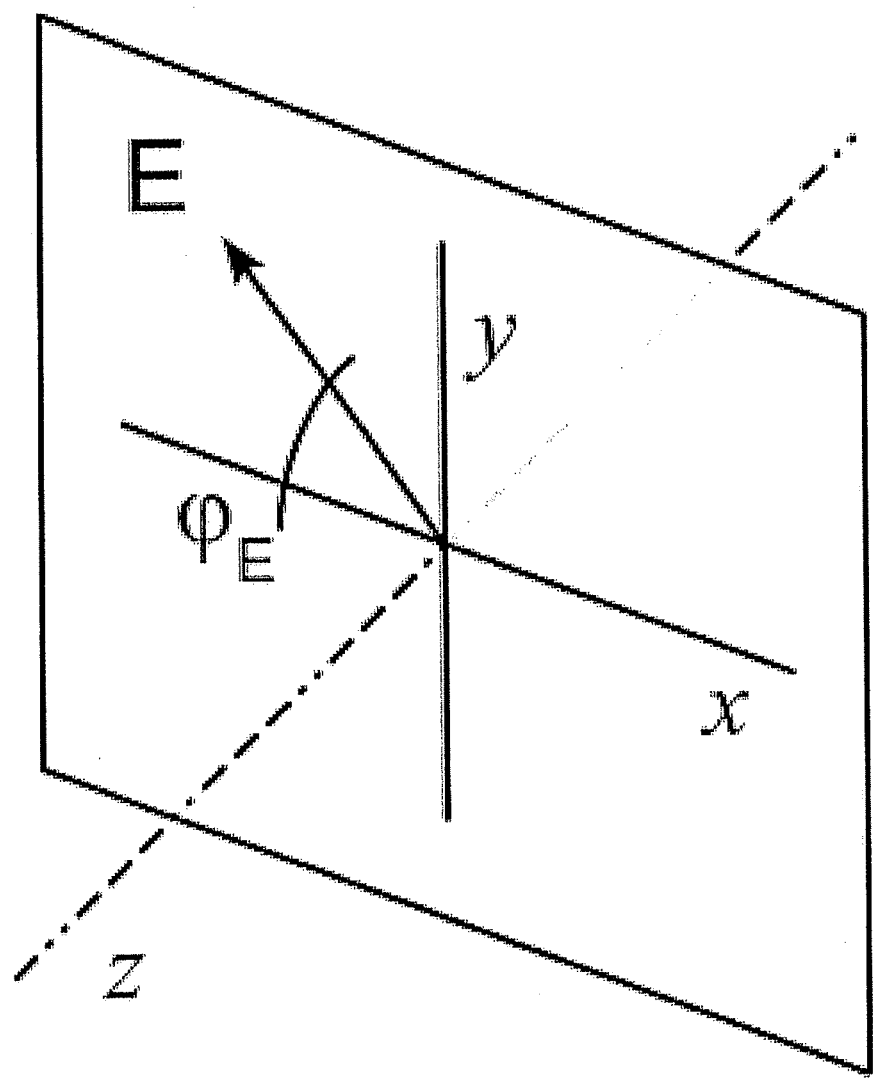
FIG. 7 is a diagram showing an example of linear polarization of the electromagnetic radiation associated with an input pulse according to an exemplary embodiment.

As shown in an exemplary embodiment FIG. 7, the input pulse Pin has an input linear polarization forming an angle $\phi_E$ with the first direction x; in other words, the electric field E associated with the input pulse Pin forms with the first direction x an angle $\phi_E$. The input pulse Pin has an input linear polarization lying on a plane orthogonal to the propagation direction z and having a direction non-parallel to the first direction x and the second direction y, i.e.:

$$\phi_E \neq n\pi \text{ and } \phi_E \neq \pi/2 + n\pi \qquad (1)$$

The first input beam Pin enters the second optical wedge A2 and its projection along the first direction x and the second direction y gives an x-component of the electrical field $E_x$ and an y-component of the electrical field $E_y$ calculated as follows:

$$E_x = E \cdot \cos(\phi_E) \qquad (1a)$$

$$E_y = E \cdot \sin(\phi_E) \qquad (1b)$$

Since the first slow polarization direction OX1 of the first and second optical wedges A1 and A2 is along the first direction x, the x-component $E_x$ travels with group velocity $v_{gs}$ (velocity for the slow direction) and $E_y$ travels with group velocity $v_{gf}$ (velocity for the fast direction). The x-component $E_x$ passes through the first optical pair 4 in time interval or delay $T_{Ax}$ by covering the distance $L_{A1}$ in the first optical wedge A1 and the distance $L_{A2}$ in the second optical wedge A2.

The time interval or delay $T_{Ax}$ for the x-component $E_x$ is given by the following expression:

$$T_{Ax} = (L_{A1} + L_{A2})/v_{gs} \qquad (2a)$$

The y-component $E_y$ passes through the first optical pair 4 in another time interval or delay $T_{Ay}$ by covering the distance $L_{A1}$ in the first optical wedge A1 and the distance $L_{A2}$ in the second optical wedge A2. The delay $T_{Ay}$ is given by the following expression:

$$T_{Ay} = (L_{A1} + L_{A2})/v_{gf} \qquad (2b)$$

$v_{gs} < v_{gf}$, therefore the time interval $T_{Ax}$ is shorter than the time interval $T_{Ay}$.

It is observed that the movable structure MT1 (FIG. 2) moves the second optical wedge A2 by an adjustable distance $M_{A2}$ along the first direction x; the distance $L_{A2}$ to be covered by the beam depends on the adjustable distance $M_{A2}$ according to equation:

$$L_{A2} = M_{A2} \tan(\alpha_{A2}) \qquad (3)$$

Therefore, the movement of the second optical wedge $A_2$ allows changing the delays $T_{Ax}$ and $T_{Ay}$, in order to obtain a wished value of the relative delay $|T_{Ax} - T_{Ay}|$.

The beam exiting the first optical wedge pair 4, under the form of two delayed pulses, enters the optical element B, which has the second slow polarization direction OX2 parallel to the second direction y. Hence, the x-component $E_x$ travels with the velocity $v_1$ and the y-component $E_y$ travels with velocity $v_{gs}$.

The x-component $E_x$ passes through the optical element B, covering the distance $L_B$ (FIG. 3), in a propagation time given by a delay $T_{Bx}$. The delay $T_{Bx}$ for the x-component $E_x$ is given by the following expression:

$$T_{Bx} = L_B/v_{gf} \qquad (4a)$$

The y-component $E_y$ passes through the optical element B, covering the distance $L_B$ (FIG. 3) in a propagation time given by $T_{By}$. The delay $T_{By}$ for the y-component $E_y$ is given by the following expression:

$$T_{By} = L_B/v_{gs} \qquad (4b)$$

As clear from a comparison with equations (2a) and (2b), the optical element B exchanges the fast and slow polarization directions with respect to the optical wedge pair 4, reversing the relative delay of the pulses. The relative delay T0 between the y-component $E_y$ and the x-component $E_x$ is:

$$T_0 = T_{By} - T_{Bx} = L_B/v_{gs} - L_B/v_{gf} = L_B(1/v_{gs} - 1/v_{gf}) \qquad (4c)$$

The delay $T_0$ defines a fixed delay between the pulses. As an example, if element B has thickness $L_B = 0$, then $T_0 = 0$.

Combination of thicknesses of the first and second optical wedges A1, A2 and optical element B allows imparting to the x-component $E_x$ and y-component $E_y$ any wished negative and positive relative delays.

At the output of Babinet-Soleil module 1, the first output pulse $P_{2x}$ shows a delay $T_x'$ with respect the input pulse Pin which is given by the sum of the delay $T_{Ax}$ of expression (2a) and the delay $T_{Bx}$ of expression (4a):

$$T_x' = T_{Ax} + T_{Bx} = (L_{A1}+L_{A2})/v_{gs} + L_B/v_{gf} \quad (5)$$

With reference to the y-component, at the output of the Babinet-Soleil module 1, the second output pulse $P_{2y}$ shows a delay $T_y'$ with respect the input pulse Pin which is given by the sum of the delay $T_{Ay}$ of expression (2b) and the delay $T_{By}$ of expression (4b):

$$T_y' = T_{Ay} + T_{By} = (L_{A1}+L_{A2})/v_{gf} + L_B/v_{gs} \quad (6)$$

The beam enters the second adjustable wedge pair 9 (FIG. 1) having the optical axis OX3 (FIG. 4) parallel to the propagation direction z; in this situation both components $E_x$ and $E_y$ travel with a corresponding group velocity $v_g$. The x-component $E_x$ and the y-components $E_y$ pass through the second adjustable wedge pair 9 covering a distance $L_{C1}$ in the third optical wedge C1 and a distance $L_{C2}$ in the fourth optical wedge C2 and undergoing the same delay $T_{Cx}$ and $T_{Cy}$:

$$T_{Cx} = T_{Cy} = (L_{C1}+L_{C2})/v_g \quad (7)$$

It is observed that the further movable structure MT2 (FIG. 4) can be used to move the fourth optical wedge C2 by an adjustable distance $M_{C2}$ along the first direction x; the distance $L_{C2}$ to be covered by the beam depends on the adjustable distance $M_{C2}$ according to equation:

$$L_{C2} = M_{C2} \tan(\alpha_{C2}) \quad (8)$$

Movement of fourth optical wedge $C_2$ changes by the same amount both delays $T_{Cx}$ and $T_{Cy}$, but no changes of the relative delay is introduced.

The total distance $L_{tot}$ covered by the beam in passing through the Babinet-Soleil module 1 and the second optical wedge pair 9 is given by the expression:

$$L_{tot} = L_{A1} + L_{A2} + L_B + L_{C1} + L_{C2} \quad (9)$$

In expression (9) the distance covered in free space propagation between the optical elements has been not included since it is not affecting the relative delay between the two pulses.

It is observed that the second adjustable wedge pair 9 can be used to vary the distance $L_{C2}$ in order to maintain constant the value of the total covered length $L_{tot}$ when an adjustment of the length $L_{A2}$ has been made to obtain a wished relative delay between the pulses associated with the x-component and the y-component.

The possibility of keeping at a constant value the total covered length $L_{tot}$ allows to minimize the difference in the total amount of the group velocity dispersion undergone by the x-component $E_x$ and the y-components $E_y$ passing through the delay device 100. This allows to obtain almost constant group velocity dispersion and pulse duration for different positions of the second optical wedge A2 along the first direction y (at distance $M_{A2}$).

Moreover, the possibility of keeping at a constant value the total covered length $L_{tot}$ shows another advantage: it maintains at a constant value the time delay experienced by the propagation through 100 of the pulse having linear polarization along the direction y.

The propagation through the Babinet-Soleil module 1 and the second optical wedge 9 imparts to components $E_x$ and $E_y$ the following total delays $T_1$ and $T_2$:

$$T_1 = T_{Ax} + T_{Bx} + T_{Cx} = (L_{A1}+L_{A2})/v_{gs} + L_B/v_{gf} + (L_{C1}+L_{C2})/v_g \quad (10a)$$

$$T_2 = T_{Ay} + T_{By} + T_{Cy} = (L_{A1}+L_{A2})/v_{gf} + L_B/v_{gs} + (L_{C1}+L_{C2})/v_g \quad (10b)$$

The second optical wedge pair 9 transmits on its output 10 a first delayed pulse $P_1$ having, as an example, linear polarization along the first direction x and a second delayed pulse $P_2$ having, as an example, linear polarization along the second direction y.

Figure 8:
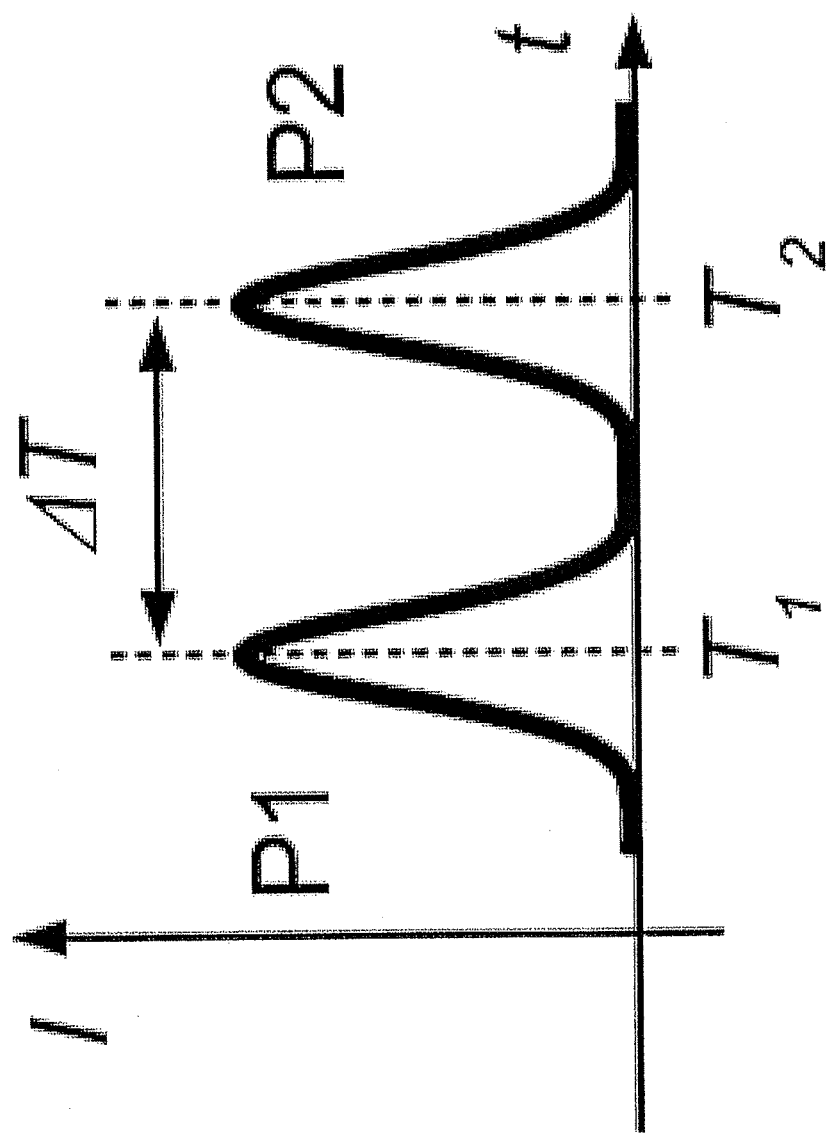
FIG. 8 is a diagram showing the shape of two delayed output pulses exiting a phase-locked delay device according to an exemplary embodiment.

The first delayed pulse $P_1$ (which can be, as an example, the fastest pulse) exits the second optical wedge pair 9 at the delay $T_1$, the second delayed pulse $P_2$ (as an example, the slowest pulse) exits the second optical wedge pair 9 at delay $T_2$, as shown in FIG. 8. The relative group delay $\Delta T$ is $\Delta T = T_2 - T_1$.

As an example, considering the distance $L_{A1}+L_{A2}=1.3$ mm and $L_B=1.6$ mm, if the group velocities $v_{go}$ and $v_{ge}$ have the values $1.7544 \times 10^8$ m/s and $1.9229 \times 10^8$ m/s, the relative group delay is $\Delta T=150$ fs.

If the input pulse $P_{in}$ has intensity $I_{in}$, the first delayed pulse $P_1$ and the second delayed pulse $P_2$ have intensities:

$$I_x = I_{in} \cdot \cos^2(\phi_E) \quad (11a)$$

$$I_y = I_{in} \cdot \sin^2(\phi_E) \quad (11b)$$

Figure 9:
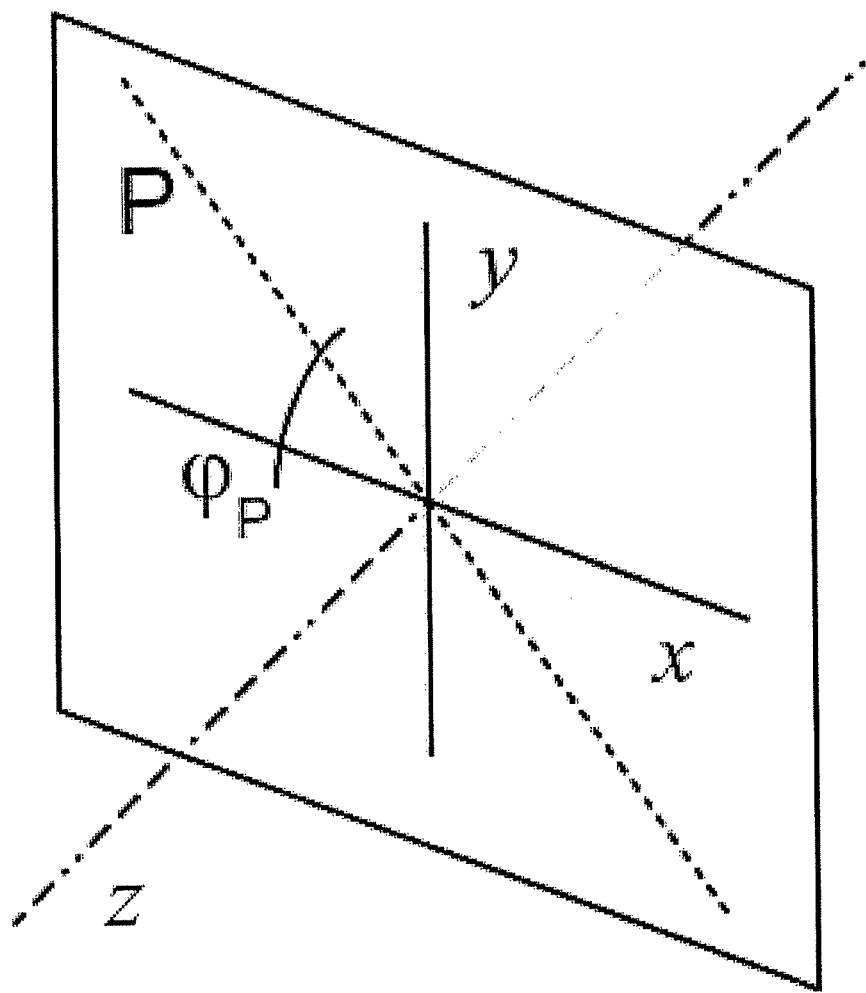
FIG. 9 is a diagram showing an example of a transmitted linear polarization imposed by an output polarizer included in a phase-locked delay device according to an exemplary embodiment.

The beam exiting the second optical wedge 9 enters the output polarizer D which allows the projection of the x-component $E_x$ and the y-component $E_y$ along the transmission axis P (FIG. 9). The intensities $I_{(x)out}$ and $I_{(y)out}$ of the x-component $E_x$ and the y-component $E_y$ after the output polarizer D are:

$$I_{(x)out} = I_{in} \cdot \cos^2(\phi_E) \cdot \cos^2(\phi_P) \quad (12a)$$

$$I_{(y)out} = I_{in} \cdot \sin^2(\phi_E) \cdot \sin^2(\phi_P) \quad (12b)$$

Fine tuning of the relative group delay $\Delta T$ can be achieved by moving the second optical wedge A2 and moving accordingly the fourth optical wedge C2 to keep constant the total covered length $L_{tot}$.

According to the considered example, the second optical wedge A2 and the fourth optical wedge C2 are moved parallel to the first direction x by the same amount $\Delta M$. The distance covered by the beam in the second optical wedge A2 is given by the formula:

$$L_{A2}' = (M_{A2} + \Delta M) \cdot \tan(\alpha_{A2}) \quad (13a)$$

The distance covered by the beam in the fourth optical wedge C2 is given by the formula:

$$L_{C2}' = (M_{C2} - \Delta M) \cdot \tan(\alpha_{C2}) \quad (13b)$$

The delays $T_x$ and $T_y$ of expressions (10a) and (10b) become the delays $T_x''$ and $T_y''$:

$$\begin{aligned} T_x'' &= (L_{A1} + L_{A2}')/v_{gs} + L_B/v_{gf} + (L_{C1} + L_{C2}')/v_g = \\ &= T_x + \Delta M \cdot [\tan(\alpha_{A2})/v_{gs} - \tan(\alpha_{C2})/v_g] \end{aligned} \quad (14a)$$

$$\begin{aligned} T_y'' &= (L_{A1} + L_{A2}')/v_{gf} + L_B/v_{gs} + (L_{C1} + L_{C2}')/v_g = \\ &= T_y + \Delta M \cdot [\tan(\alpha_{A2})/v_{gf} - \tan(\alpha_{C2})/v_g] \end{aligned} \quad (14b)$$

It is observed from eq. (14b) that when $\alpha_{A2}=\alpha_{C2}$ and $v_{gf}=v_g$, then $T_y''=T_y=$constant: the y-component $E_y$ exhibits a delay which does not change when the second optical wedge $A_2$ and the fourth optical wedge $C_2$ are moved by the same amount $\Delta M$.

It is noted that when fabrication errors cause $\alpha_{A2} \neq \alpha_{C2}$ and/or when $v_{gf} \neq v_g$ the device is equipped to keep $T_y$ constant: the systematic error can be compensated for by rotating the optical wedge with the smaller apex angle by means of the rotatable structure MR1 and the further rotatable structure MR2.

When $\alpha_{A2} = \alpha_{C2}$ and $v_{gf} = v_g$ (or equivalently rotation is applied to one of the wedges), the delays are:

$$T_x'' = T_x + \Delta M \cdot \tan(\alpha_{A2}) \cdot [1/v_{gs} - 1/v_{gf}] \quad (15a)$$

$$T_y'' = T_y \quad (15b)$$

Relative group delay $\Delta T$ is therefore:

$$\Delta T = T_x - T_y + \Delta M \cdot \tan(\alpha_{A2}) \cdot [1/v_{gs} - 1/v_{gf}] \quad (16)$$

Therefore, fine regulation of the relative delay of the order of $\Delta M \cdot \tan(\alpha_{A2}) \cdot [1/v_{gs} - 1/v_{gf}]$ can be obtained. As an example, for apex angles of 7° and $\Delta M$ of 0.1 micrometers, relative delays of the order of 6 as can be obtained. The Applicants observe that the known Babinet-Soleil compensators are not designed and used to obtain the above mentioned maximum values $\Delta T_M$ of the group delay $\Delta T$ which are obtainable with the described delay device 100.

Moreover, it's also noticed that the delay device 100 is used, in accordance with particular applications, to dynamically vary the group delay $\Delta T$ within the above indicated ranges, comprised between the minimum value $\Delta T_m$ and the maximum value $\Delta T_M$, performing a plurality of adjustments of the group delay according the delay increment $\delta T$. The possibility of dynamically scanning a range of values of the group delay $\Delta T$ is not offered by the Babinet-Soleil compensators in accordance with prior art techniques.

It is noted that in accordance with further exemplary embodiments the first optical wedge A1, the second optical wedge A2, the optical element B, the third optical wedge C1 and the fourth optical wedge C2 can be arranged with arbitrary order along the propagation direction z.

Particularly, the following further configurations are possible along the propagation direction z, wherein the output polarizer D is kept as the last component of the line:
a) first optical wedge pair 4, second optical wedge pair 9 and optical element B;
b) second optical wedge pair 9, first optical wedge pair 4, optical element B;
c) optical component B, first optical wedge pair 4, second optical wedge pair 9;
d) optical element B, second optical wedge pair 9, first optical wedge pair 4;
e) second optical wedge pair 9, optical element B, first optical wedge pair 4.

Particularly, the configurations a), b), c) and d), wherein the first optical wedge pair 4 and the second optical wedge pair 9 are placed in sequence along the propagation of the radiation, allow to better adjust the time delays since one single movable structure, such as the first movable structure MT1, of FIG. 2, can be employed to move the second optical wedge A2 and the fourth optical wedge C2 by the same amount $\Delta M$. In addition, in configurations b) and d), the second and fourth wedges A2 and C2 can be mounted in optical contact.

In a further exemplary embodiment, the first A1 and second A2 optical wedges are cut so that their slow polarization direction is parallel to the second direction y. In this case, the slow polarization direction of optical element B is parallel to the first direction x.

It is also observed that the above described operation of the delay device 100 refers to beams having a finite transverse dimensions d, as an example, comprised between 0.5 mm and 1 cm.

Figure 10:
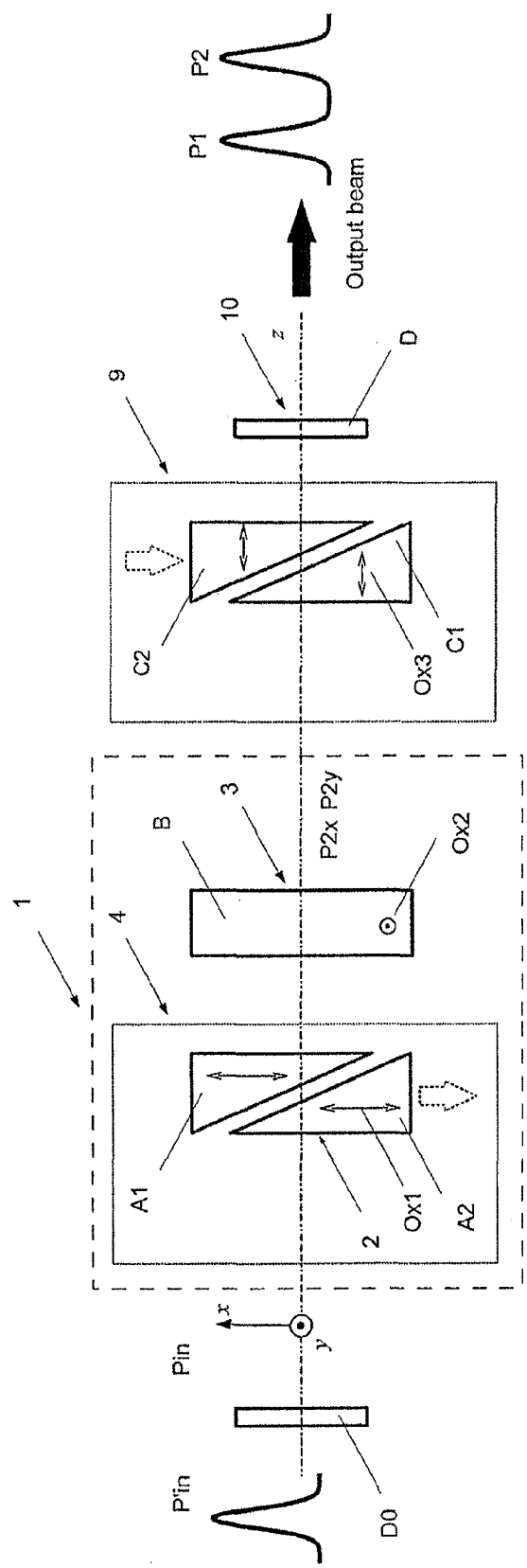
FIG. 10 is a view showing a phase-locked delay device employing an input polarizer according to another exemplary embodiment.

FIG. 10 refers to a third exemplary embodiment of the delay device 100 in which an additional input optical element D0 has been employed in order to obtain an input pulse $P_{in}$ having a linear polarization $\phi_E$ in accordance with expression (1). The input optical element D0 is structured to convert a further input pulse $P_{in}'$ having linear polarization not complying with expression (1) into the input pulse $P_{in}$ having the required linear polarization. The input optical element D0 can be a polarizer, a half-wave plate or a periscope. The input element D0 can be also used in any of the embodiments a) to e) above listed and the one of FIG. 1.

According to another exemplary technique, the conditions of expression (1) can be fulfilled by suitably rotating the delay device 100 around the propagation direction z.

Experimental Results

The Applicant has performed experiments by manufacturing and testing a delay device analogous to delay device 100 described with reference to FIG. 1. The first wedge pair 4, the optical element B and the second wedge pair 9 have been realized in α-barium borate (α-BBO). The α-BBO material is a negative uniaxial birefringent optical crystal. Its optical axis is oriented parallel to the second direction y and orthogonal to the first polarization direction OX1 of the first and second optical wedges A1 and A2; the optical axis is parallel to the first direction x and orthogonal to the second polarization direction OX2 of the optical element B; in negative uniaxial birefringent media this corresponds to defining the slow direction of the first and second optical wedges A1 and A2 along direction OX1, and the slow direction of the optical element B along OX2. The optical axis of the third and fourth optical wedges C1 and C2 is oriented along the optical axis OX3, thus giving $v_{gf} = v_g$.

The above defined apex angles $\alpha_{A1}$, $\alpha_{A2}$, $\alpha_{C1}$, $\alpha_{C2}$ were equal to 7°: $\alpha_{A1} = \alpha_{A2} = \alpha_{C1} = \alpha_{C2} = 7°$.

The angles defining the linear polarizations of the input pulse $P_{in}$ and the delayed pulses $P_1$ and $P_2$ were $\phi_E = \phi P = 45°$. The test was performed using an input pulse $P_{in}$ at a wavelength comprised in the range 500-700 nm.

Figure 11:
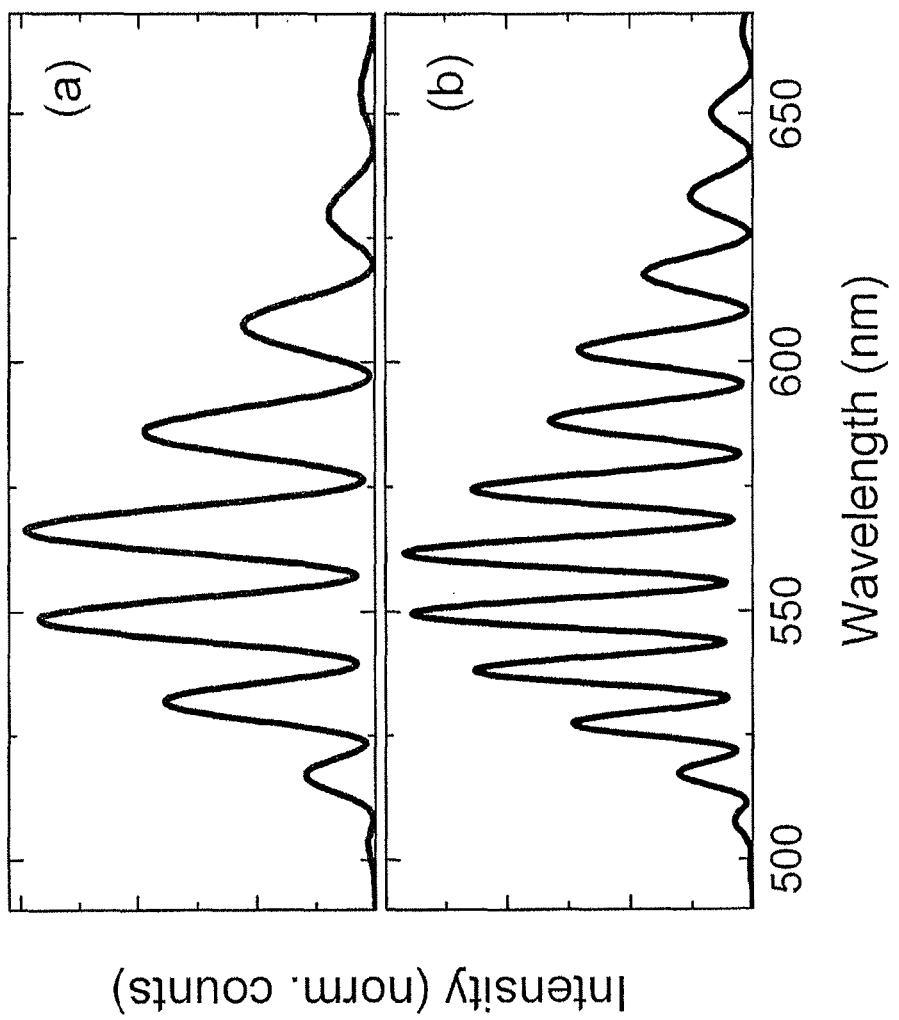
FIGS. 11A and 11B are diagrams showing two interferometry patterns of two pulses obtained with a phase-locked delay device in two different operating conditions according to an exemplary embodiment.

The two generated collinear delayed pulses $P_1$ and $P_2$ were coupled to a broadband spectrometer to observe spectral interferometry. The delayed pulses $P_1$ and $P_2$ produced spectral interference fringes, as can be noticed by FIGS. 11A and 11A which show the obtained interference patterns for two different position conditions of the second optical wedge A2 and the fourth optical wedge C2.

The density of fringes is correlated to the pulses relative delay. From spectral interferometry the following parameters can be measured: the relative pulse delay, the carrier phase and the stability of the relative delay for long experimental time.

Figure 12:
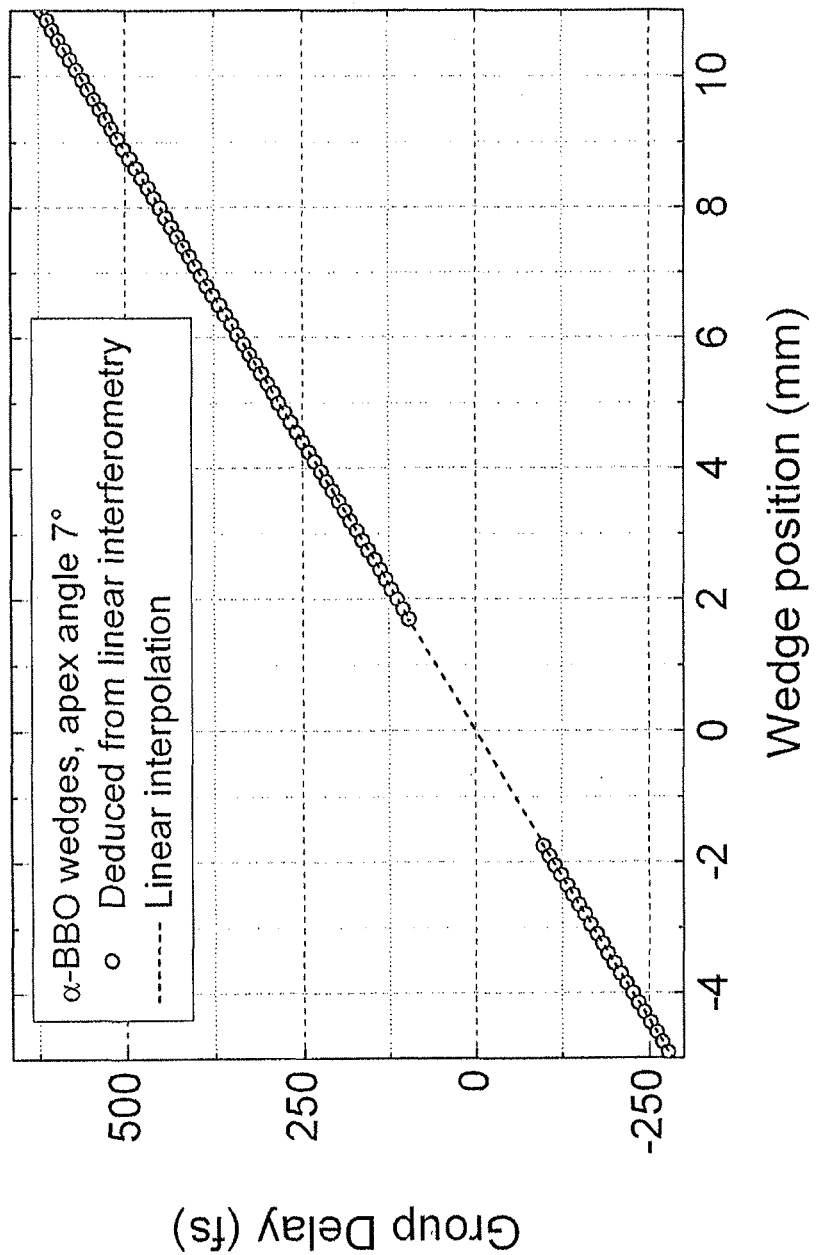
FIG. 12 is a diagram showing measured values of the group delay provided by a phase-locked delay device according to an exemplary embodiment.

The evolution of the fringe pattern and group delay upon synchronously moving second and fourth wedges A2 and C2 is shown in FIG. 12. The experimental curve shows the relative delay $\Delta T$ between the first delayed pulse $P_1$ and the second delayed pulse $P_2$ (i.e. the total delay introduced by passing through the delay line 100) versus the glass position, which is the translation $M_{A2}$ of the second optical wedge A2 by means of the first movable structure MT1 (FIG. 2).

This result is in very good agreement with the delays calculated from the dispersion equations of α-BBO.

Figure 13A:
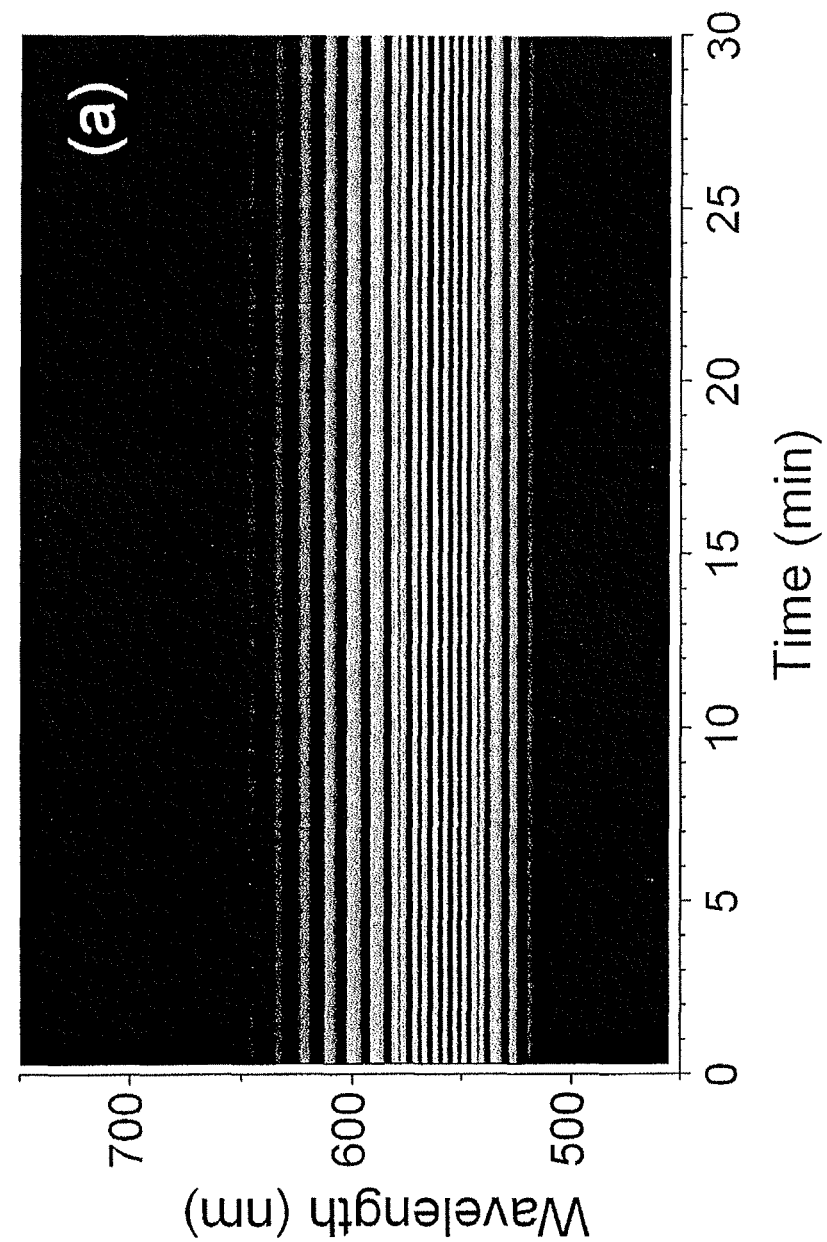
FIGS. 13A and 13B are diagrams showing the evolution of fringe pattern and the evolution of the group delay respectively and relative phase for a static configuration of a phase-locked delay device according to an exemplary embodiment.
Figure 13B:
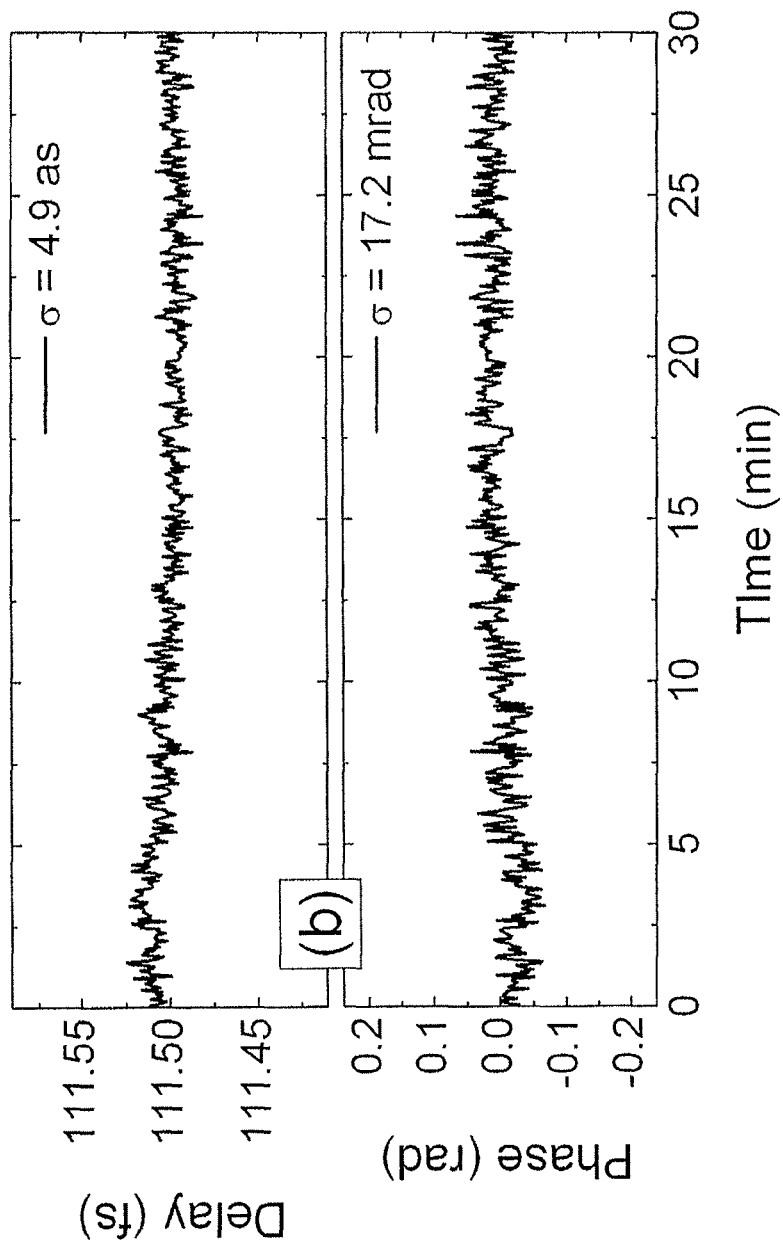

The stability behaviour of the relative delay for a fixed position of wedges is shown in FIGS. 13A and 13B. FIG. 13A shows a sequence of fringe patterns; FIG. 13B shows the delay between the first pulse $P_1$ and the second pulse $P_2$, and their relative phase deduced from panel 13a) for a static configuration of the experimental set up of the delay device 100. The retrieved static fluctuations correspond to less than Tc/360.

Figure 14:
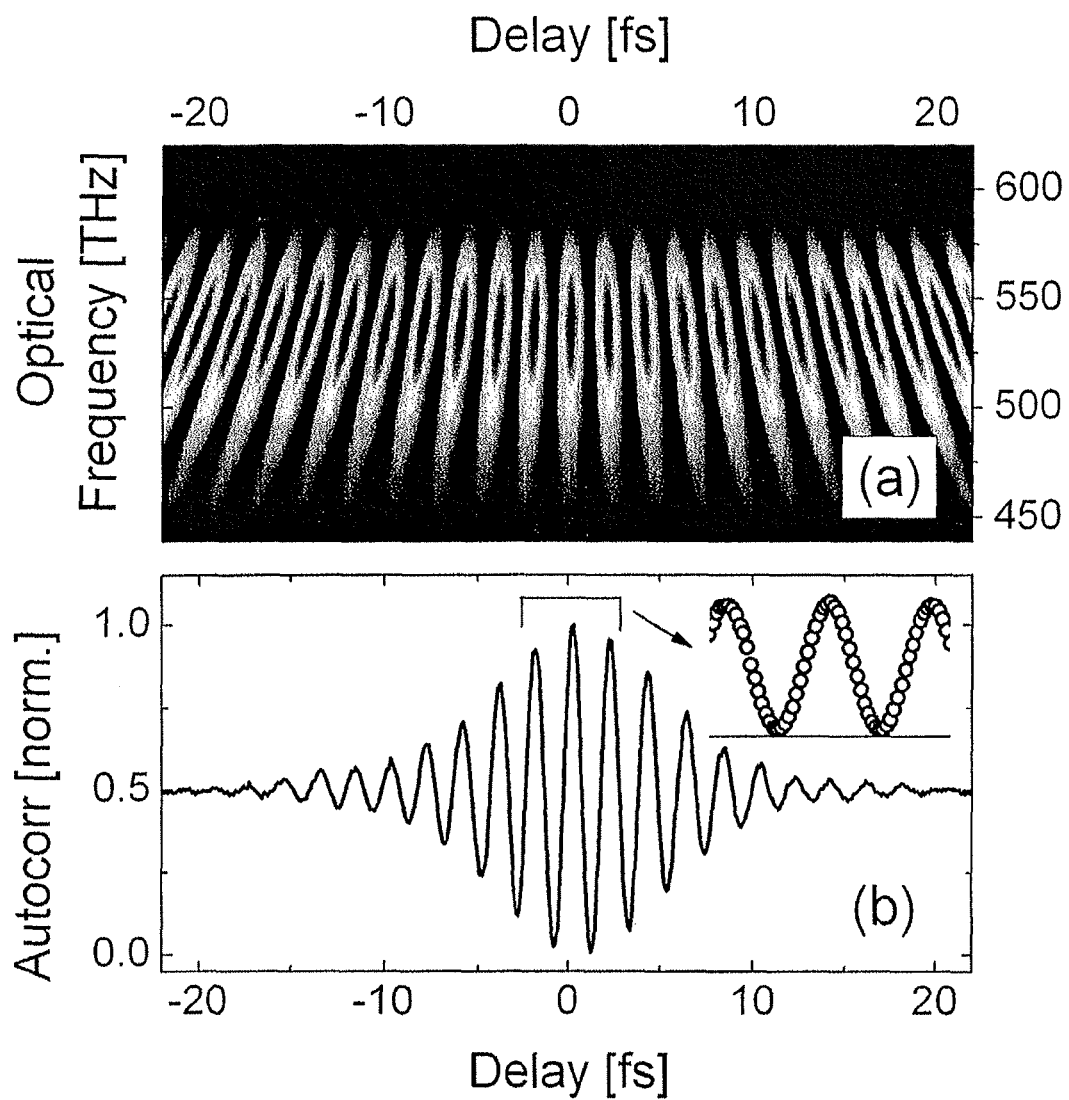
FIGS. 14A and 14B are diagrams showing a linear auto-correlation of a pulse exiting a phase-locked delay device according to an exemplary embodiment.

FIGS. 14A and 14B refer to the linear autocorrelation of the pulses exiting the delay device 100 according to an exemplary embodiment. In greater details, FIG. 14A shows the spectrally resolved map; FIG. 14B shows the intensity trace and an inset shows the zoom of the trace.

The inset of FIG. 14B shows the very high temporal resolution of the delay device 100; it is noted that these data were acquired after moving adjustable distance $M_{A2}$ with steps of 2 μm. With a first movable structure MT1 with 0.1 μm maximum resolution, the delay device 100 can introduce delays down to 3.6 as (attosecond).

It is observed that the delay device 100 as above described can be manufactured in compact and simple way and the delay between the two pulse replicas is controllable and reproducible over a small fraction of the optical wavelength.

Moreover, it is noticed that the two pulses are interferometrically phase locked without need of any active feedback control since there is no path separation that can be affected by thermal fluctuations in the device. Such device does not require any costly mechanism that adaptively corrects for delay/phase fluctuations and can be considered as a plug and play device in a standard transient absorption spectroscopy setup.

In addition, it can be employed in various spectral ranges without any limitation.

Figure 15:
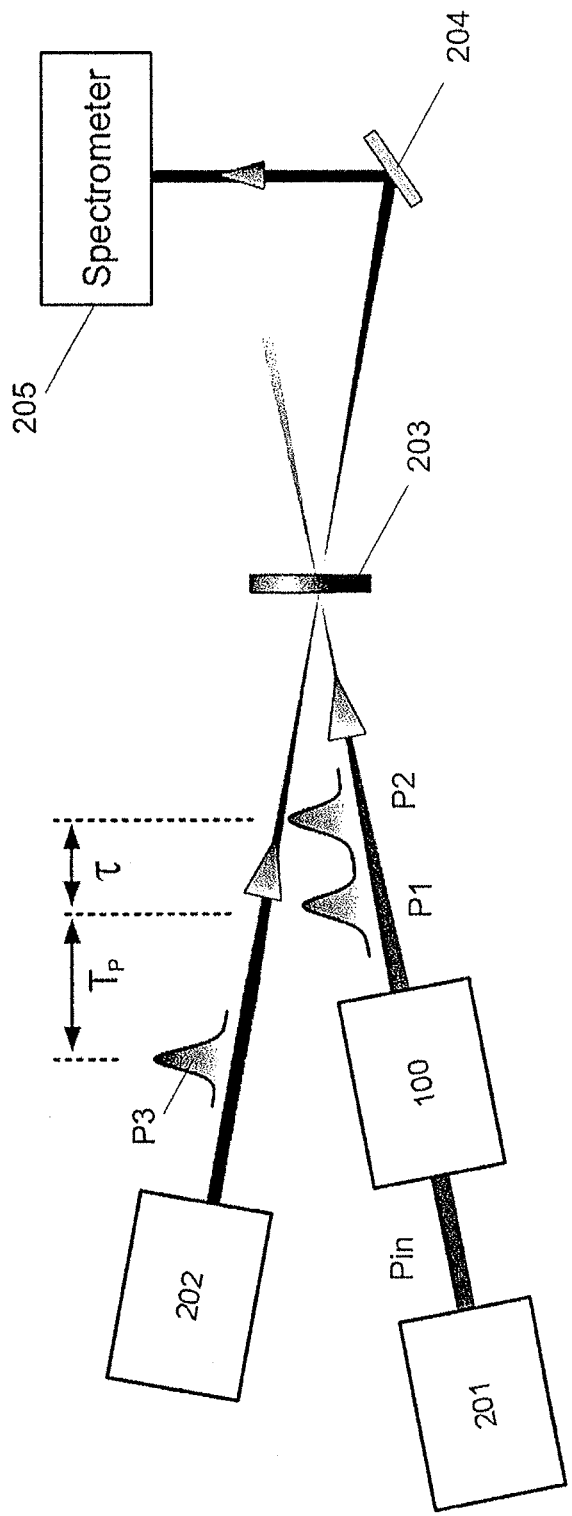
FIG. 15 is a view schematically showing a two-dimension spectroscopy system employing a phase-locked delay device according to an exemplary embodiment.

FIG. 15 shows an exemplary embodiment of a two-dimension (2D) spectroscopy system 200 employing a pump-probe geometry. The 2D spectroscopy system 200 includes: a first pulse source 201 of the input pulse $P_{in}$, the phase-locked delay device 100, a second pulse source 202, a sample to be measured 203 in the beams focal plane, a mirror 204 and a spectrometer 205.

In particular, the pump-probe geometry implemented by the system of FIG. 15 uses the first delayed pulse $P_1$ and the second delayed pulse $P_2$ (which are collinear) as the exciting sequence for the sample that is then probed by a third non-collinear pulse $P_3$. The spectrometer 205 measures the transient changes induced by the pulse pair $P_1$ and $P_2$ as a function of their delay $\Delta T = \tau$ at a fixed delay Tp.

It is observed that an interferometric stability is required since a Fourier transform has to be operated over the time trace obtained by scanning the relative delay $\Delta T = \tau$ between the first delayed pulse $P_1$ and the second delayed pulse $P_2$. In fact, these pulses will build up a nonlinear polarization oscillating with the optical cycle period thus requiring a high control of the optical delay with the relative pulse carriers jittering less than $\lambda/100$.

The delay device 100 is particularly suited to generate the interferometrically locked pulses $P_1$ and $P_2$ used to excite the sample 203 since it can easily fit in existing pump-probe setups and commercial systems, in which only one pulse is used for excitation.

The delay device 100 allows an easy and precise scan of the delay τ without changing the $T_p$ value since one of the two pulse replicas is not delayed in an absolute temporal frame. The reliability and the sub-optical cycle control are then extremely important for an optimal data elaboration with the Fourier transform over the τ axis. An additional advantage is the possibility to have different polarizations in the exciting pulse sequence as required for some two-dimensional spectroscopy experiments.

Figure 16:
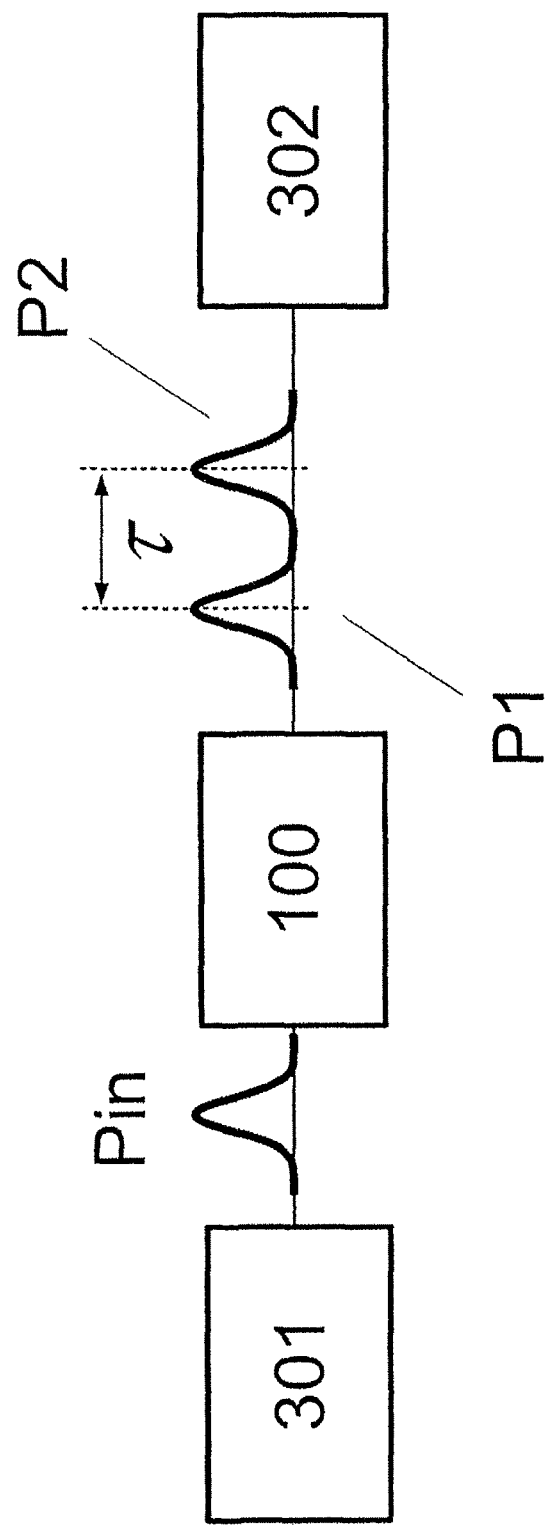
FIG. 16 is a view schematically showing a Fourier Transform spectrometer employing a phase-locked delay device according an exemplary embodiment.

The delay device 100 can also be used in applications concerning the Fourier Transform spectrometer, typically used in the MIR (Medium Infra-Red) spectral region. FIG. 16 shows schematically a Fourier Transform spectrometer 300 comprising: a further pulse source 301 of the input pulse Pin, the delay device 100 and a detector 302.

At various delays τ, light from first pulse $P_1$ and second pulse $P_2$ collected by detector 302 gives rise to interference traces similar to the one shown in FIG. 14B. Fourier transform of the trace gives the intensity spectrum of the further source 301. The detector 302 detects the transmitted energy corresponding to interferometric linear correlation of the first pulse $P_1$ and second pulse $P_{12}$.

The invention claimed is:

1. A phase-locked delay device, comprising:
   an input port configured to receive an input electromagnetic radiation pulse; said input pulse being to be propagated along a propagation direction and having a first linear polarization different from both a first direction, which is orthogonal to the propagation direction, and a second direction, which is orthogonal to the first direction and the propagation direction;
   an adjustable Babinet-Soleil module optically coupled to said input port, having a first polarization direction parallel to said first direction; wherein the adjustable Babinet-Soleil module is structured to:
      provide from the input pulse a first pulse polarized along the first direction and a second pulse collinear to said first pulse and polarized along the second direction, and
      introduce an adjustable group delay ΔT between the first pulse and the second pulse ranging from a minimum value $\Delta T_m$ and a maximum value $\Delta T_M$; the maximum value $\Delta T_M$ being a value greater than 10 fs,
   wherein the Babinet-Soleil module comprises:
      a first adjustable wedge pair in a first birefringent material structured to introduce a first total shorter delay in the first pulse and a first total longer delay in the second pulse; and
      an optical element in a second birefringent material structured to introduce a longer delay in the first pulse and a shorter delay in the second pulse.

2. The delay device of claim 1, wherein the maximum value $\Delta T_M$ is comprised between 10 fs and 10 ps.

3. The delay device of claim 2, wherein the maximum value $\Delta T_M$ is comprised between 10 fs and 4 ps.

4. The delay device of claim 3, wherein the maximum value $\Delta T_M$ is greater than 100 fs.

5. The delay device of claim 1, wherein the device is structured to adjust the group delay ΔT to assume values between −4 ps and +4 ps.

6. The delay device of claim 1, wherein the Babinet-Soleil module is structured to adjust the group delay ΔT with an increment δT lower than 10 attoseconds (as).

7. The delay device of claim 1, wherein the Babinet-Soleil module is structured to adjust the group delay ΔT with an increment δT lower than 5 attoseconds (as).

8. The delay device of claim 1, further comprising:
   an input polarizer having an output coupled to said input port and structured to receive an electromagnetic radiation pulse having a second polarization different from said first linear polarization and convert the electromagnetic radiation pulse into said input pulse.

9. The delay device of claim 1, wherein said first linear polarization forms an angle of 45° with the first direction and the second direction.

10. The delay device of claim 1, wherein the first wedge pair comprises:
    a first optical wedge in the first birefringent material defining a first wedge-surface, having the first polarization direction and structured to introduce a first shorter delay in the first pulse and a first longer delay in the second pulse;

a second optical wedge in the first birefringent material having said first polarization direction, defining a second wedge-surface faced to said first wedge-surface and configured to introduce a second shorter delay in the first pulse and a second longer delay in the second pulse; at least one between the first and second optical wedges being movable to vary a length of an optical path along the propagation direction.

11. The delay device of claim 10, further comprising:
a second adjustable wedge pair in a third material optically coupled to the Babinet-Soleil module, structured to have an optical axis parallel to said propagation direction and introduce an equal delay in electromagnetic radiation pulses propagating along the third optical axis; the second adjustable wedge pair being configured to be movable to vary an optical path along the propagation direction so as to keep at a constant value a total length covered by electromagnetic radiation in passing through the phase-locked delay device.

12. The delay device of claim 11, wherein the second adjustable wedge pair is placed in one of the following positions along the propagation direction: between the input and the first adjustable wedge pair; between the first adjustable wedge pair and the first optical element.

13. The delay device of claim 11, wherein said optical element is placed before the first wedge pair according to the propagation direction of the radiation.

14. The delay device of claim 11, wherein said second adjustable wedge pair comprises:
a third optical wedge having said optical axis, defining a third wedge-surface and structured to introduce a first delay in said electromagnetic radiation pulses; and
a fourth optical wedge having said optical axis, defining a fourth wedge-surface faced to said third wedge-surface and configured to introduce a second delay in said electromagnetic radiation pulses; at least one between the first and second optical wedges being movable to vary said further optical path along the propagation direction.

15. The delay device of claim 11, wherein the first, the second and the third materials are made in at least one of the following materials: uniaxial birefringent material, biaxial birefringent material.

16. The delay device of claim 11, further comprising:
a first movable structure supporting at least one of said first and second optical wedges to adjust radiation delays,
a second movable structure supporting at least one of said third and fourth optical wedges to further adjust radiation delays,
a further movable structure supporting at least one of said first and second optical wedges and at least one of said third and fourth optical wedges.

17. Interferometry system comprising:
a first pulse source configured to generate an input electromagnetic radiation pulse to be propagated along a propagation direction and having a first linear polarization different from a first direction, which is orthogonal to the propagation direction, and a second direction, which is orthogonal to the first direction and the propagation direction; an input port configured to receive the pulse associated with a wave carrier having an optical cycle Tc;
an adjustable Babinet-Soleil module optically coupled to said input port, having a first polarization direction parallel to said first direction; wherein the adjustable Babinet-Soleil module is structured to:
provide from the input pulse a first pulse polarized along the first direction and a second pulse collinear to said first pulse and polarized along the second direction, and
introduce an adjustable group delay $\Delta T$ between the first pulse and the second pulse ranging from a minimum value $\Delta T_m$ and a maximum value $\Delta T_M$; the maximum value $\Delta T_M$ being a value greater than 10 fs;
an apparatus structured to analyze a interferometry beam obtained from said first and second pulses,
wherein the Babinet-Soleil module comprises:
a first adjustable wedge pair in a first birefringent material structured to introduce a first total shorter delay in the first pulse and a first total longer delay in the second pulse;
an optical element in a second birefringent material structured to introduce a longer delay in the first pulse and a shorter delay in the second pulse.

18. The interferometry system of claim 17, wherein said system is a two-dimension spectroscopy system and said apparatus includes:
a second pulse source configured to emit a second input pulse,
a sample to be measured by the two-dimensional spectroscopy system configured to receive the first pulse, the second pulse and the second input pulse and provide for an output beam;
spectrometer structured to receive and analyze the output beam.

19. The interferometry system of claim 17, wherein said system is a Fourier Transform spectrometer and said apparatus includes:
a detector for detecting transmitted energy corresponding to interferometric linear correlation of said first pulse and second pulse.

* * * * *